(12) United States Patent
Casto

(10) Patent No.: US 7,937,672 B2
(45) Date of Patent: May 3, 2011

(54) SYSTEM AND METHOD FOR SCROLLING THROUGH A LIST

(75) Inventor: Paul D. Casto, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 57 days.

(21) Appl. No.: 12/210,709

(22) Filed: Sep. 15, 2008

(65) Prior Publication Data
US 2009/0049407 A1 Feb. 19, 2009

Related U.S. Application Data

(63) Continuation-in-part of application No. 11/194,999, filed on Aug. 2, 2005, now abandoned.

(51) Int. Cl.
*G06F 3/048* (2006.01)

(52) U.S. Cl. ......... 715/830; 715/828; 715/829; 715/784

(58) Field of Classification Search .................. 715/828, 715/829, 830, 784
See application file for complete search history.

(56) References Cited

U.S. PATENT DOCUMENTS

| | | | |
|---|---|---|---|
| 6,300,967 B1 * | 10/2001 | Wagner et al. | 715/784 |
| 2003/0076301 A1 * | 4/2003 | Tsuk et al. | 345/159 |
| 2003/0126130 A1 | 7/2003 | Martino et al. | |
| 2003/0128192 A1 * | 7/2003 | van Os | 345/173 |
| 2004/0113952 A1 * | 6/2004 | Randall | 345/830 |
| 2004/0202059 A1 | 10/2004 | McComas | |
| 2005/0159189 A1 * | 7/2005 | Iyer | 455/566 |
| 2007/0033202 A1 | 2/2007 | Casto | |
| 2007/0085841 A1 * | 4/2007 | Tsuk et al. | 345/173 |
| 2007/0242057 A1 * | 10/2007 | Zadesky et al. | 345/173 |

* cited by examiner

*Primary Examiner* — Mahesh H Dwivedi
(74) *Attorney, Agent, or Firm* — Jimmy L. Funke (57) ABSTRACT

A system and method for scrolling through a list uses control and display algorithms for scrolling through a long list of text strings. The control algorithm interfaces to the user via a rate-based scheme to switch the display through various levels of abstraction where higher levels of abstraction are displayed "in-situ" on the single-line display. These higher levels of abstraction display as starting characters or words that are common to a group of entries in the alphabetized list. Multiple levels of abstraction are supported, where lower levels of abstraction are displayed as longer strings of characters, representing smaller groups of entries in the given list of text strings. Higher levels of abstraction are displayed as shorter character strings. The rate of user movement is detected for the display to change to a previous or next item in the list if below a predetermined threshold while increasing the abstraction level if the user rapidly selects different options.

14 Claims, 4 Drawing Sheets

SYSTEM AND METHOD FOR SCROLLING THROUGH A LIST

CROSS-REFERENCE TO RELATED APPLICATION

This application is a continuation-in-part of U.S. application Ser. No. 11/194,999 entitled "System and Method for Scrolling Through a List" filed on Aug. 2, 2005 now abandoned, and assigned to Delphi Technologies, Inc.

FIELD OF THE INVENTION

The invention relates generally to systems and methods (collectively the "system") for scrolling through a list.

BACKGROUND OF THE INVENTION

Human beings interact with an increasing number of different devices. Many of those interactions involve "scrolling" through a list of items to select the desired item. For example, there are numerous different MP3 players available to consumers that are capable of storing thousands of different songs. Given the portability of such devices, the devices are often quite small, and thus such devices often possess relatively small display panels. In some contexts, the display panel is only large enough to display a single line of information. In other contexts, more than a single line can be displayed, but the display capacity of the device is nonetheless dwarfed by the total volume of available information.

SUMMARY OF THE INVENTION

The invention relates generally to systems and methods (collectively the "system") such as the control and display algorithms for scrolling through a list. A device using the system can selectively and automatically modify the format in which a label in the list is displayed. The selective modifications to a display format can be influenced by a current search state that is identified from a variety of search states defined within the system. A speed metric, a measurement relating to the speed in which a user is scrolling through the list, can influence the current search state of the system. The system can be more fully understood upon reading the following detailed description in conjunction with the accompanying drawings.

DETAILED DESCRIPTION

The invention relates generally to systems and methods (collectively the "system") such as the control and display algorithms for scrolling through a list consisting of names, labels or other characters.

The system uses a format heuristic to selectively influence the manner in which a label is displayed in the list being searched. The system captures a speed metric from the interactions of the user with the scrolling list. The speed metric can influence what is determined to be the current "search state" of the system. The current "search state" can influence the manner and degree to which the format heuristic influences the display of a label in the list.

The method used in the invention uses a control algorithm for monitoring the user interaction via a control knob or wheel. Typically, each click or partial rotation of the control wheel changes the display to show the previous or next entry in the list. However, if the user moves rapidly through the list via multiple clicks of the control wheel which is faster than some predetermined calibrated rate, the control algorithm will change the display to show the list in a higher level of abstraction as described herein.

In operation, each time the user moves at a substantially rapid rate through the displayed list, the control algorithm will advance to the next higher level of abstraction. The level of abstraction may be defined as the level of complexity or detail by which the user views the list information. For a higher the level of abstraction, the less detail of list information will be displayed while the lower level of abstraction, the more detail is shown. The highest level of abstraction in the single system display showing the least detail such that only the first character of a group of entries is displayed.

Different embodiments of the system can involve a different number of different search states. Search states can be defined as speed ranges, with one search state being identified as the current search state on the basis of the speed metric falling within the speed range associated with that search state. In some embodiments, search states are predefined by the manufacturer of the applicable device. In other embodiments, search states can be influenced or even entirely defined and customized by users. A user profile can be used to customize the format heuristic, which controls the nature and extent to which display formats for labels are selectively modified, the number of different search states, and the range of speed metrics that make up a particular search state.

The user may also manually select a higher level of display abstraction by actuating a switch though a button press or paddle lever to change the display to a higher level of abstraction. This process can continue until only the first character of each group of entries is displayed. While at a higher level of abstraction, if the user stops turning the knob or wheel, the control algorithm may change the display to the next lower level of abstraction after a calibrated time interval. If more time passes without movement of the knob or wheel then the control algorithm may progressively change to the next lower level of abstraction, once every calibrated time period. This process can continue until the display is at the lowest level of abstraction, where the entire string of each entry in the list is displayed. Alternatively, the user may also manually select a lower level of abstraction by pressing a button or paddle lever to change the display to a lower level of abstraction. This process can continue until the display is at the lowest level of abstraction, where the entire string of each entry in the list is displayed.

The display algorithm determines what is displayed to the user on the single-line display. At the lowest level of abstraction, the entire single line of the currently selected text string is displayed. While at a higher level of abstraction, the same single-line display is changed to show only the first characters or words of the selection. These letters or words may represent multiple entries in the alphabetized list that have the same first characters or words. At each higher level of abstraction, the displayed starting phrase becomes shorter, and represents more items in the alphabetized list. The highest level of abstraction consists of a single starting character of a group of text strings in the alphabetized list.

By way of example, without limitation, in the context of an MP3 player, a label consisting of an artist's name and a song title could be formatted differently, depending on the current "search state." As illustrated in Table 1, in a stopped state or in a slow state, the player can manifest by visual display or audibly reproducing) display "Artist Name—Song Title." In a medium state (e.g., Medium1 or Medium2), that same label could instead be manifested as "Artist Name—S******," or alternatively as "Artist Name ***********". In a fast state, that label could be further truncated as "A**********************".

TABLE 1

| Search State | Displayed Label |
|---|---|
| Stopped | Artist Name-Song Title |
| Slow | Artist Name-Song Title |
| Medium1 | Artist Name-S********* |
| Medium2 | Artist Name ************ |
| Fast | A*********************** |

Different embodiments of the system can involve different "search states" and different ways of modifying display formats for a label. There are a wide variety of different devices that can involve the activity of scrolling through a list. Both consumer devices and industrial devices can involve the task of scrolling through a list, and making a selection. Examples of devices that can include the functionality of the system include: MP3 players; cell phone address books; handheld electronic games; pocket computers; industrial, transportation, and other forms of embedded computers; desktop computers; industrial controls; and many other types of devices (collectively "devices") can benefit from the system.

In addition to accommodating a wide variety of different devices, the system can also accommodate a wide variety of different output components. Some output components are limited to a display capacity of a single line, while in other embodiments, each individual label may individually require multiple lines, with several labels being displayed in a simultaneous or substantially simultaneous manner.

Figure 1:
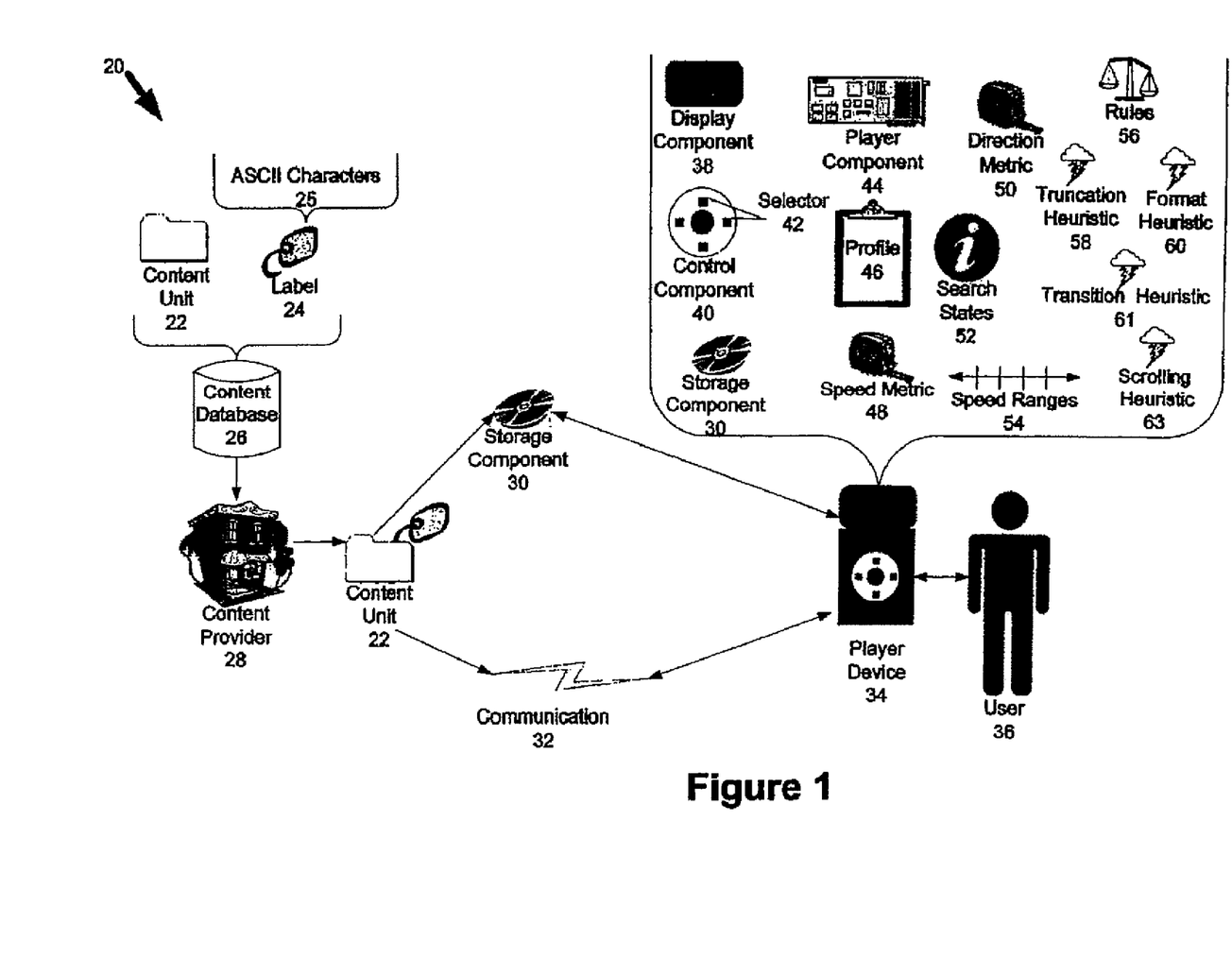
FIG. 1 is a block diagram illustrating some examples of elements that can be included in the system for scrolling through a list of labels.

FIG. 1 is a block diagram illustrating some examples of elements that can be included in a system 20 for scrolling through a list of labels 24. The specific example illustrated in FIG. 1 pertains to a media player 34 or other form of portable consumer device. As discussed above, other embodiments of the system 20 can involve a wide variety of different device types, fulfilling different functions, and providing different types of information in lists to be scrolled through by a user 36.

A content unit 22 is a unit of content that is played or otherwise accessed on the host device, such as a player device 34. In an embodiment of the system 20 in which music is played, a content unit 22 is typically an individual song. In other media player embodiments of the system 20, a content unit 22 could be an entire album, a portion of an individual song, a movie, a scene within a movie, a video game, a particular section within a video game, or any other unit of content capable of being played on the player device 34. In some embodiments, the scope of the content unit 22 can be defined by a user 36. For example, an individual user 36 could "break down" a song into several sections, with each section constituting a distinct content unit 22. In non-media playing embodiments of the system 20, content units 22 relate to the different options that a user 36 can select with respect to the particular device. For example, in an industrial device, users 36 may need to select from various settings and configurations that relate to the functionality of the device.

A label 24 is metadata or any information that is associated with a content unit 22. A label 24 is often a digital label that is embedded into a content unit 22. In the example of a music playing device, a label 24 can potentially include the name of the song, the name of the artist, the name of the album, the year that the song or album was published, the producer of the album, and virtually any other information relating to the content unit 22. Different types of content units 22 can involve different types of information being included within a label 24. For example, in a movie playing context, the label 24 could include information about the director and/or actors, and in a videogame playing context, the label 24 could include a current score. The types of information that can be incorporated into a label 24 are potentially limitless. A content provider 28 or some other entity involved in distributing the content unit 22 will often be the decision maker with respect to what types of information should be included within labels 24 for a particular embodiment of the system 20. In other embodiments, the user 36 through the use of a user profile 46 can influence the contents of the label 24.

The information in a label 24 is often embodied in a string of ASCII characters 25. A single label 22 can include a potentially limitless number of characters, although an output component 38 will often have a finite display capacity. In some embodiments of the system 20, only alphanumeric characters can be included in a label 24.

A database 26 of content, which can also be referred to as a content database 26, can be used by system 20 to store content units 22, labels 24, and associations between units 22 and labels 24. The content units 22 and labels 24 stored in one or more content databases 26 used by the system 20 can be made accessible to a user 36 in many different ways using many different types of technologies. The content units 22 and labels 24 within the content database 26 can be distributed in a variety of different ways, some of which are identified below.

The system 20 can include a wide variety of different content databases 26 operated and controlled by one or more content providers 28.

The system 20 can be used to distribute content units 22 from one or more content providers 28. Content providers 28 can also be referred to as providers 28. Some content providers 28 may focus on a single type of content unit 22 such as music, while others may be involved in many different types of content units 22.

Content providers 28 can also distribute content units 22 in a wide variety of different ways using a wide variety of different technologies. As illustrated in the Figure, content units 22 are associated with labels 24 before the content units 22 are distributed to users 36.

One category of distribution techniques is the use of a storage component 30 that is distributed to users 36. For example, music content units 22 can be distributed in the form of cassette tapes, records, CDs, DVDs, MP3 files, etc. Any mechanism capable of storing a content unit 22 can constitute a storage component 30. It is anticipated that new and improved storage components 30 will be created in the future, and that the system 20 will incorporate such advances.

Another category of distribution techniques involves the transmission of a content unit 22 from a remote source using a communication 32. For example, music content units 22 can be transmitted to users 36 via satellite radio communications 32. A communication 32 can include any technology or process for exchanging information between a source device and a recipient device. Radio, satellite radio, broadcast television, cable television, computer networks, and the Internet are common examples of communications 32. It is anticipated that new and improved communications 32 will be created in the future, and that the system 20 will incorporate such advances.

A player device 34 is any device capable of "playing" or otherwise using or benefiting from a content unit 22 and/or displaying a list of labels 24. The variety of player devices 34 is commensurate to the variety of different types of content units 22. Player devices 34 can also be referred to as players 34. Many players 34 can be also be referred to as media players 34.

Examples of players 34 can include radios, satellite radios, CD players, DVD players, PDAs, cell phones, portable music players, laptop computers, desktop computers, and a variety of other portable and stationary devices.

Regardless of the particular type of player 34. a player 34 typically includes an output component 38, a control component 40, and a player component 44.

As discussed above, the system 20 is not limited to player devices 34 or even to consumer devices. Industrial devices can also incorporate the processing of the system 20.

A user interface component 38 is the means by which the label 24 is made manifest to the user 36. In most of the examples set forth herein, the display component 38 is discussed in the context of visible indicia; however, it is contemplated that an audio device (i.e., speaker) can be used to make the label information audibly accessible to the user with or without a visual component. Such an audio device would benefit the visually impaired or benefit any user when the player device is used in low-light conditions.

In some music playing embodiments, a small output component 38 will simply display or audibly reproduce the name of the song currently being played by the player 34. Such a player 34 could be further limited by a display capacity of a single line. On the other end of the continuum, other embodiments of the system 20 can involve display capacities of multiple labels 24 with each label 24 requiring multiple lines to display.

An example of single line display is:
"Artist Name—Song Name."
An example of a multiple line display is:
"Artist Name."
"Song Name."
"Album Title."

A control component 40 is the means by which users 36 interact with the player 34 and provide their instructions to the player 34. Different embodiments of players 34 can involve a wide variety of different control components 40. Control components 40 can also be referred to as controllers 40. Controllers 40 can involve different types of buttons, switches, knobs, wheels, dials, voice recognition components, and other types of physical and electronic mechanisms for receiving instructions from users 36 (collectively "selector" 42).

For example, in an embodiment of the system 20 that involves a satellite radio player 34, selector 42 can be used to change the channel and the volume of the player 34. The control component 40 can be used to capture a speed metric 48 and a direction metric 50.

A player component 44 is the component of the player device 34 that allows the player device 34 to access the content unit 22, which is often stored on a storage component 30. For example, in the example of a CD player, the player component 44 is the mechanism within the CD player that actually reads the information located on the CD. In the context of a player 34 accessing content units 22 from a remote source such as a satellite radio station, the player component 44 is the electronics within the player 34 that allows the player 34 to access the satellite signal. A player component 44 can also be referred to as a content access component 44. In non-player embodiments of the system 20, the player component 44 is the component within the device that performs the function of the device.

A profile 46 is a bundle of information stored within the player 34 that relates to user preferences for a particular user 36 or a particular group of users 36. For example, a profile 46 could include information relating to speed preferences for or historical speed attributes of a particular user 36. Different profiles 46 can define different search states 52 with different speed ranges 54. Profiles 46 can influence which content units 36 made accessible to the user 36, as well as the ways content units 36 are organized within the player 34. For example, one user 36 might prefer classical music while another user 36 prefers jazz. One user 36 might prefer to listen to music at a relatively quiet volume while another user 36 might prefer a substantially louder volume.

A speed metric 48 is a measurement relating to the speed in which a user 36 is scrolling through the list of labels 24. The system 20 can capture the speed metric 48 in a variety of different ways. Some embodiments of the system 20 can include more than one speed metric 48. In many embodiments of the system 20, the speed metric 48 is the period of time (usually measured in milliseconds) between movements of the selector from one label 24 in the list to another label 24 in the list. The speed metric 48 is often an important input to the system 20 for determining the current search state.

A direction metric 50 can be captured simultaneously or substantially simultaneously with the capture of the speed metric 48. Both the speed metric 48 and the direction metric 50 are captured through user 36 interactions with the selector 42 of the control component 44. In many embodiments, the direction metric 50 relates to the scrolling direction within the list. In other embodiments, the direction metric 50 can relate to more complex directional information. In some embodiments of the system 20, the direction metric 50 is an input to a transition heuristic 61, as discussed below.

A search state 52 can also be referred to as a search mode or a search status. Different embodiments of the system 20 will have different search states 52. There are typically two or more potential search states 52 in most embodiments of the system 20. In many embodiments, the current search state is identified from the pool of potential search states 52 using one or more speed metrics 48 as the sole form as input. In other embodiments, the speed metric 48 is merely one input into the process of determining which search state 52 is the current search state 52.

In many embodiments of the system 20, search states 52 are defined with respect to a speed range 54 that can be compared to the speed metric 48. Different embodiments of the system 20 can involve different search states 52 and different speed ranges 54 associated with those search states 52.

In embodiments of the system 20 involving four predefined search states 52, search states 52 could be associated with speed ranges 54 as illustrated in Table 2.

TABLE 2

| Search State | Speed Range |
| --- | --- |
| Stopped | Greater than about 750 ms per click |
| Slow | Between about 90 ms and 750 ms per click |
| Medium | Between about 30 ms and 90 ms per click |
| Fast | Less than about 30 ms per click |

A rule 56 is a processing rule of the system 20 that cannot be altered by users 36. Processing rules 56 constrain the possible options available to users 36 in creating profiles 46 and in defining search states 52 and speed ranges 54, as well as various heuristics discussed below. In some embodiments of the system 20, there is no user profile 46.

A truncation heuristic 58 is a type of format heuristic 60 discussed below. The truncation heuristic 58 may be used to modify the display format by truncating the label 24 wherein characters 25 are replaced with placeholders such as an "*", "-", or " . . . ". The selective modification of characters 25 can be done from a left to right direction, from a left to right direction, or in accordance with some other processing rule 56.

Table 1 above provides some examples of processing that can be performed using the truncation heuristic 58.

A format heuristic 60 is a process which may be implemented by the system 20 that can selectively modify the display of a label 24 depending on the currently selected search state 52. The truncation heuristic 58 is an example of a format heuristic 60. The format heuristic 60 can also involve sounds, colors, graphics, and virtually any other means of communicating with users 36.

A transition heuristic 62 is a process implemented by the system 20 that can change the current search state from one search state 52 to another search state 52. For example, certain search states 52 can be associated with certain rules 56 that impact the transition from one search state 52 to another search state 52.

For example, some embodiments of the system 20 can be configured to not change to a slower search state so long as the selector 42 keeps moving (i.e. the only change to a slower search state occurs if the system 20 would otherwise enter a search state of "stopped"). In such embodiments, the system 20 can be configured to allow changes to faster search states 52 without impediment.

Different embodiments of the system 20 may hinder or configure transitions between search states 52 differently.

A scrolling heuristic 63 is a process implemented by the system 20 that impacts the way in which users 36 scroll through a list of labels 24. For example, the scrolling heuristic 63 can operate so that a user 36 is not forced to advance the selector 42 one click per entry (e.g. label 24). The number of labels advanced by a single click can be determined by the current search state 52 of the system 20. For example, in a "fast" search state 52, the entire label 24 except for the first character 25 can be filled with a placeholder. Each click of the selector 42 switches to the next displayed character, even though a single character may represent multiple labels 24. Truncations with respect to the "medium" and "slow" search states 52 can similarly form the basis for accelerated scrolling.

A user 36 is typically a human being, although animals and machines can also potentially be users 36. Users 36 are often the beneficiaries and/or recipients of the content units 22 played on the player 34. In other embodiments, users 36 are merely the operators of the device (such as in industrial embodiments) embodying the system 20.

Figure 2:
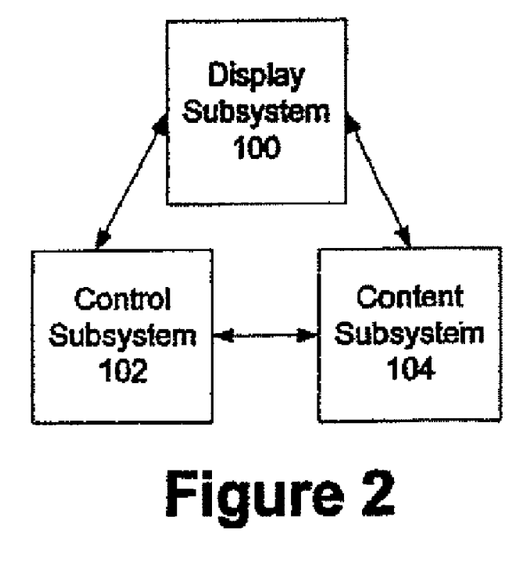
FIG. 2 is a block diagram illustrating an example of a subsystem-level view of the system.

FIG. 2 is a block diagram illustrating an example of a subsystem-level view of a system 20. As indicated by the arrows originating from and pointing towards the various subsystems, each subsystem can interact and communicate with any other subsystem.

An output subsystem 100 is the subsystem by which labels 24 and other information relating to particular content units 22 are made manifest to users 36. Subsystem 100 may be a visible system, an audio system or both. The output subsystem 100 may include an output component 38. It is through the output subsystem 100 that the impact of truncation heuristics 58, format heuristics 60, and scrolling heuristics 63 are made manifest to users 36.

The output subsystem 100 manifests information originating from a content subsystem 104 as selectively modified by user interactions received through a control subsystem 102.

An external light may be used to illuminate the output component 38 (for indicia based components 38). In some embodiments, the output subsystem 100 may include multiple light sources. In some embodiments, the output subsystem 100 can be configured to modify the luminosity of a light source, and influence the light source in ways beyond the mere activation or deactivation of the light source.

A control subsystem 102 can also be referred to an interaction, interface or controller subsystem 102 because it is the means by which users 36 interact with the system 20. In some embodiments, the control subsystem 102 allows users 36 to expressly configure the functionality of the system 20. The control subsystem 102 can be used to create, modify, and delete profiles 46. The control subsystem 102 includes the control component 40 and the selector 42, and all means for interactions between the system 20 and the user 36. Metrics such as the direction metric 50 and the speed metric 48 are captured through the control subsystem 102.

The control subsystem 102 allows information to be retrieved from the content subsystem 104 and made accessible to users 36 through the display subsystem 100.

A content subsystem 104 is the subsystem by which content units 22 and labels 24 are accessed by the system 20. The content subsystem 104 can also include the player component 44 and the storage component 30. The content subsystem 104 provides the information that is displayed through the display subsystem 100, and interacted with through the control subsystem 102.

Figure 3:
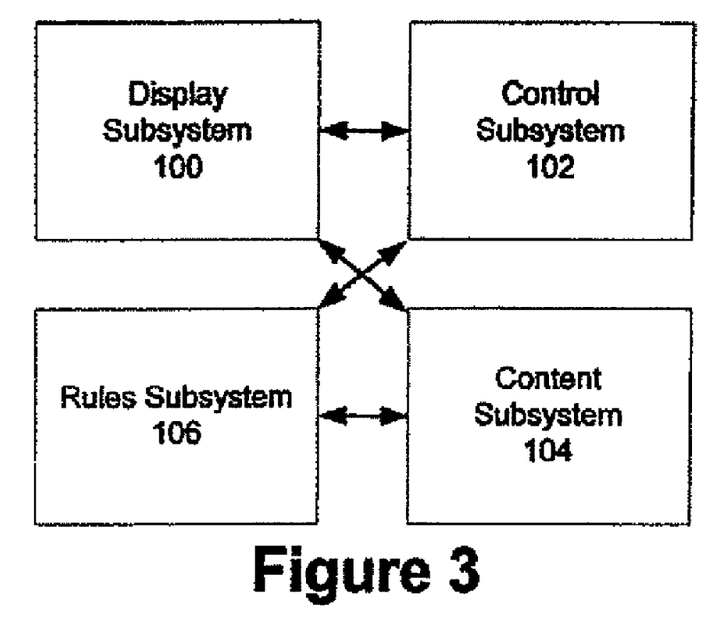
FIG. 3 is a block diagram illustrating an example of a subsystem-level view of the system.

FIG. 3 is a block diagram illustrating an example of a subsystem-level view of a system 20 for playing media content units 22. FIG. 3 includes a rules subsystem 106 that can be configured to ultimately control how the various user 36 interactions with the system 20 influence the processing of the system 20. The rules subsystem 106 can include the rules 56, the truncation heuristic 58, the format heuristic 60, the transition heuristic 61, and the scrolling heuristic 63. In other embodiments of the system 20, those heuristics can be located within the control subsystem 102 and/or the output subsystem 100.

Figure 4:
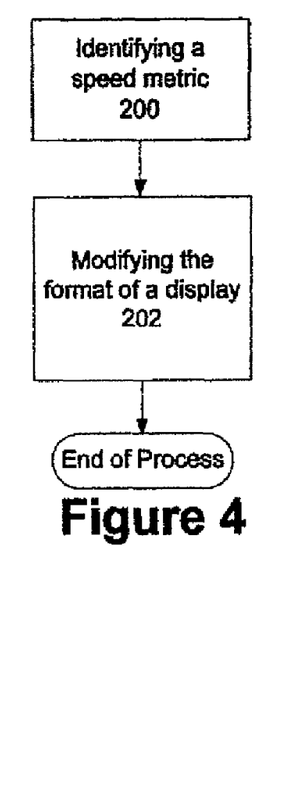
FIG. 4 is a flow chart diagram illustrating an example of a process to selectively modify the display format of a label.

FIG. 4 is a flow chart diagram illustrating an example of a process to selectively modify the display format of a label 24. At 200, a speed metric 48 is identified. At 202, the format of a displayed label 24 is selectively modified. The modifications are influenced by the speed metric 48.

Figure 5:
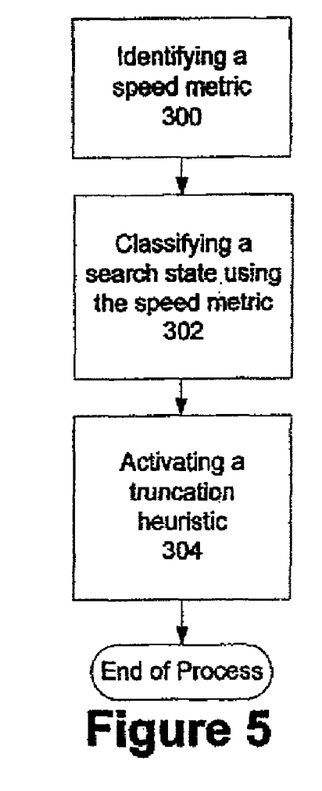
FIG. 5 is a flow chart diagram illustrating an example of a process to selectively modify the display format of a label.

FIG. 5 is a flow chart diagram illustrating an example of a process to selectively modify the display format of a label 24. At 300, at least one speed metric is identified 300. As discussed above, in many embodiments of the system 20, the speed metric 48 is a measure of time between user interactions with the selector 42. At 302, a current search state 52 is classified by comparing one or more speed metrics 48 to one or more speed ranges 54. Table 2 (displayed above) provides an example of different speed ranges 54 that can be associated with different search states 52. At 304, a truncation heuristic 61 can selectively modify the display format of the label 24 being currently displayed. In other embodiments, other aspects of the format heuristic 63 can also be invoked. Table 1 (displayed above) provides an example of different display formats that can be influenced by the current search state 52.

Figure 6:
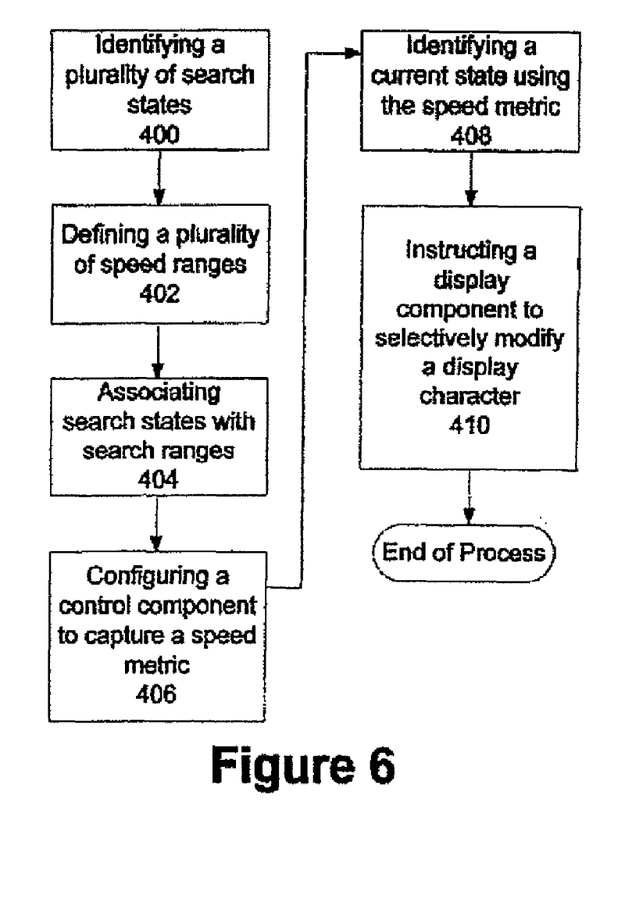
FIG. 6 is a flow chart diagram illustrating an example of a process for configuring a device using the system.

FIG. 6 is a flow chart diagram illustrating an example of a process for configuring a device using the system 20. At 400, various potential search states 52 can be identified. The number of search states 52 can vary between different embodiments of the system 20. Typically, the system 20 will have at least two search states 52. There is virtually no limit to the number of potential search states 52 that can be supported by the system 20. Examples of search states 52 can be found in both Table 1 and Table 2, as disclosed above.

At 402, a plurality of speed ranges 54 can be defined. Examples of speed ranges 54 are displayed in Table 2, disclosed above. The speed ranges 54 can be defined using empirical evidence captured from the specific context of the applicable device. At 404, speed ranges 54 can be associated with search states 52 for the purpose of future state determinations using the speed metric 48 as an input. At 406, a control component 40 can be configured to capture the speed metric 48. In some embodiments, the control component 40 is also configured to capture the direction metric 50. At 408, the process for identifying a current search state using the speed metric 48 is configured into the system 20. At 410, the process for instructing an output component 38 to selectively modify a display character within the current label 24 is configured into the system 20. An example of the display modifications of the truncation heuristic 61 is provided in Table 2 above. Other modifications can be incorporated through a format heuristic 60, as discussed above.

Figure 7:
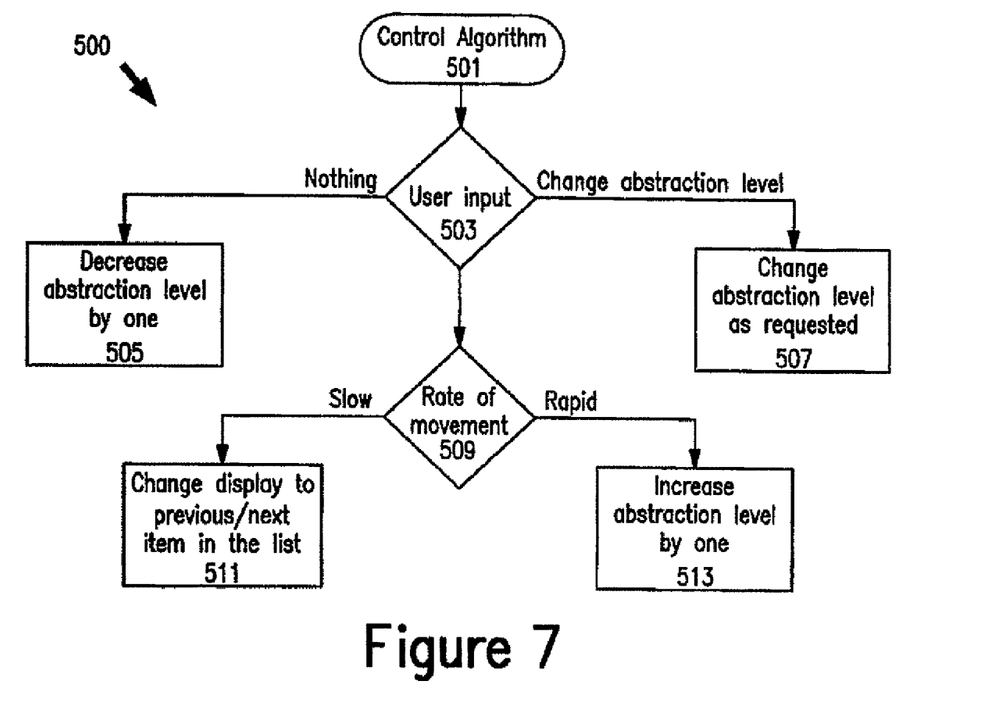
FIG. 7 is flow chart diagram illustrating the process used by the control algorithm in accordance with an embodiment of the invention.

FIG. 7 is a flow chart diagram illustrating the process 500 used by the control algorithm in accordance with an embodiment of the invention. The process using the control algorithm 501 includes determining by the user if a change in abstraction level is desired 503. With no user input, the abstraction level is decreased by one 505. If there is user input, then a change in abstraction level is performed as requested 507. Once there is a selection in the list, a determination is made of the rate of movement 509. If the user input rate of movement is below a predetermined threshold, a change to the display to the previous/next item in the list 511. However, if the user input rate of movement is above a predetermined threshold, the abstraction level is increased by one 513.

Figure 8:
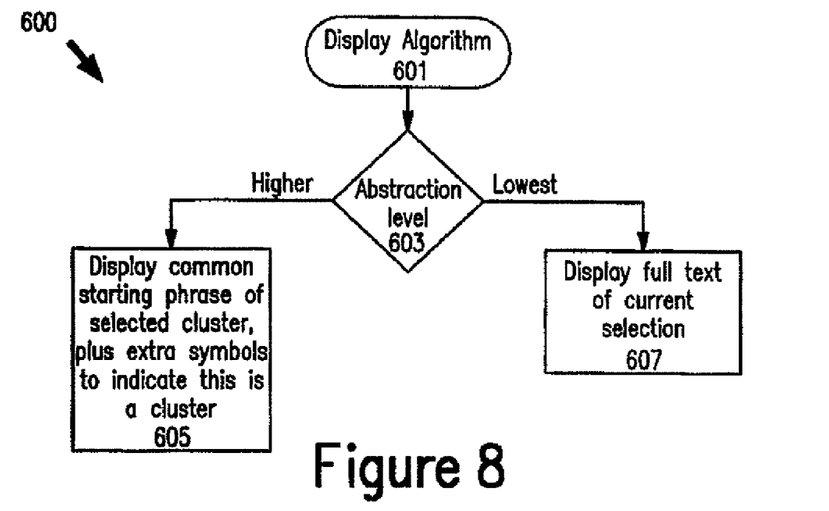
FIG. 8 is a flow chart diagram illustrating the process used by the display algorithm in accordance with an embodiment of the invention.

FIG. 8 is a flow chart diagram illustrating the process 600 used by the display algorithm in accordance with an embodiment of the invention. The display algorithm 601 operates by determining if there is a change in the abstraction level 603. If a higher level of abstraction is requested, a common starting phrase is displayed of a selected group or cluster where extra symbols are added to indicate the cluster 605. If a lower level of abstraction is requested a longer text string is displayed 607. Only at the lowest level of abstraction will the full text be displayed.

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. A method for scrolling through a list in an electronic device comprising the steps of:
   providing a display having a single line for displaying alphanumeric text for one entry of an alphabetized list and a terminating character string, said alphanumeric text including an alphanumeric text string having alphanumeric text characters and said terminating character string including one or more terminating characters, wherein said one or more terminating characters includes using a same terminating-type character;
   replacing the display with a alphanumeric text phrase representing a cluster of items in said alphabetized list when a user requests a higher level of abstraction such that the alphanumeric text phase consists of at least one alphanumeric text character configured to form a common starting phrase of the group of alphabetized entries of which a currently displayed alphanumeric entry is a member; and
   navigating though multiple levels of abstraction using a control algorithm such that attaining each higher level of abstraction displays a successively shorter alphanumeric text string in said currently displayed entry while further displaying a successively larger terminating character string containing the same terminating-type character in said currently displayed entry,
   wherein when at least an alphanumeric text character in the alphanumeric text string is removed from the display the same terminating-type character is added in said terminating character string to replace the removed alphanumeric text character.

2. The method for scrolling through the list as in claim 1, wherein the terminating-type character is represented by a symbol being one of "*" and "-" and ".".

3. The method for scrolling through the list as in claim 1, further including the step of:
   navigating though the multiple levels of abstraction using the control algorithm such that each higher level of abstraction displays shorter text strings which represent a larger number of individual entries in the alphabetized list.

4. A method for scrolling through a list in an electronic device including the steps of:
   providing a display having a single line for displaying alphanumeric text for one entry of an alphabetized list and a terminating character string, said alphanumeric text including an alphanumeric text string having alphanumeric text characters and said terminating character string including one or more terminating characters, wherein said one or more terminating characters includes using a same terminating-type character;
   replacing the display with an alphanumeric text phrase representing a cluster of items in said alphabetized list when a user requests a higher level of abstraction such that said alphanumeric text phase consists of at least one character that forms a common starting phrase of a group of alphabetized entries of which a currently displayed alphanumeric entry is a member;
   utilizing a rate-based control algorithm such that if the user advances through said the alphabetized list at a rate faster than a predetermined value the level of abstraction is increased by one from the currently displayed entry wherein the increased level of abstraction displays a successively shorter alphanumeric text string in said currently displayed entry while further displaying a successively larger terminating character string containing the same terminating-type character in said currently displayed entry, and if the user advances through said alphabetized list at a rate slower than the predetermined value the display is changed to one of a previous and next item from the currently displayed entry in the alphabetized list; and updating the display after the step of utilizing the rate-based control algorithm using a common starting phrase of a group of alphabetized entries of which a currently displayed entry is a member;

wherein when at least an alphanumeric text character in the alphanumeric text string is removed from the display the same terminating-type character is added in said terminating character string to replace the removed alphanumeric text character.

5. The method for scrolling through the list as in claim 4, wherein the electronic device comprises a user profile, and the predetermined values are input by the user in to the user profile.

6. The method for scrolling through the list in an electronic device as in claim 4, further comprising the step of:

allowing the user to manually select one of a higher and a lower level of abstraction on the currently displayed entry by using a paddle lever associated with the electronic device.

7. The method for scrolling through the list as in claim 4, wherein the terminating-type character is represented by a symbol being one of "*" and "-" and ".".

8. A method for scrolling through a list as in claim 4, further including the step of:

navigating though multiple levels of abstraction using a control algorithm such that each higher level of abstraction displays shorter text strings which represent a larger number of individual entries in the alphabetized list.

9. The method for scrolling through the list as in claim 1, wherein with removal of each alphanumeric text character in said alphanumeric text string being displayed on the display represents to the user a larger number of individual entries in one of the cluster of items and the alphabetized list being available for access by the user.

10. The method for scrolling through the list as in claim 4, further including the step of, reducing the level of abstraction with the device of the currently displayed entry to a next lower abstraction level if the user does not scroll the alphabetized list for a predetermined time period.

11. The method for scrolling through the list as in claim 4, further including the step of, reducing the level of abstraction with the device of the currently displayed entry to a lowest level of abstraction if the user does not scroll the alphabetized list for at least one predetermined time period, whereby the lowest level of abstraction includes the currently displayed entry having a full text string of characters with no terminating string character.

12. The method for scrolling through the list as in claim 4, wherein the electronic device is configured to audibly reproduce the currently displayed entry to the user.

13. The method for scrolling through the list as in claim 4, wherein the predetermined value includes a plurality of speed ranges associated with a plurality of search states, and the level of abstraction is determined by a time rate of movement at which the user scrolls the alphabetized list, and the time rate of movement correlates with a speed range in the plurality of speed ranges associated with each search state.

14. The method for scrolling through the list as in claim 13, wherein the plurality of search states comprises a fast, a medium, a slow, and a stopped search state, and the plurality of speed ranges associated with the plurality of search states correspond to an amount of time for the user to move between clicks generated by a selector element in electrical connection with the electronic device in combination with a scrolling truncation heuristic to determine a selection of the search state, and time values in a speed range for the slow search state are generally less than time values in a speed range for the stopped search state and time values in a speed range for the medium search state are generally less than the time values in the speed range in the slow search state and time values in a speed range for the fast search state are generally less than the time values in the speed range for the medium search state.

* * * * *